(No Model.)
E. A. LE SUEUR.
MEANS FOR COUNTERBALANCING END PRESSURE IN STEAM TURBINES.
No. 545,238. Patented Aug. 27, 1895.
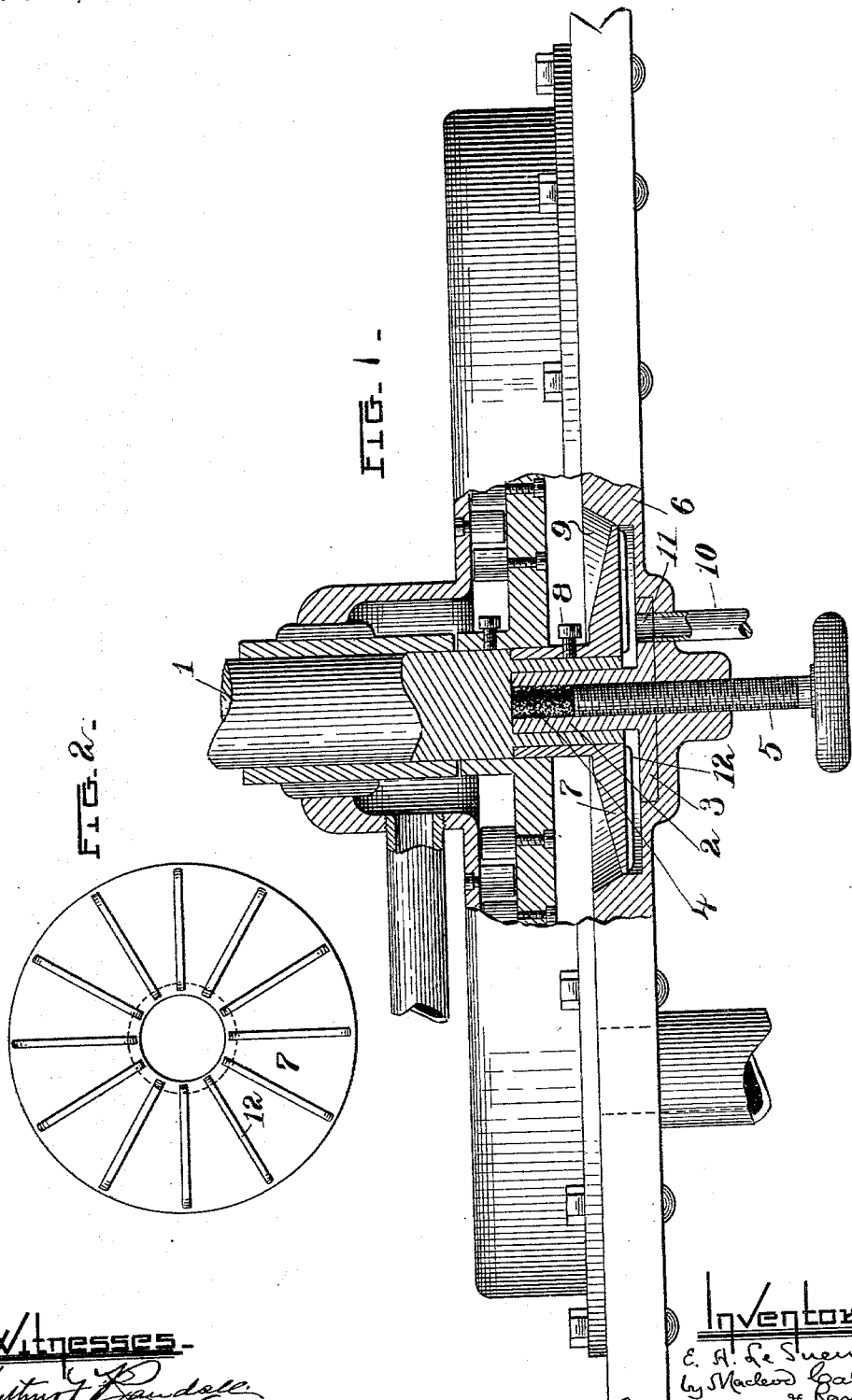
Witnesses
Arthur J. Randall.
Robert Wallace.
Inventor
E. A. Le Sueur
by Macleod Calver
& Randall
his Attorneys

UNITED STATES PATENT OFFICE.

ERNEST ARTHUR LE SUEUR, OF OTTAWA, CANADA.

MEANS FOR COUNTERBALANCING END-PRESSURE IN STEAM-TURBINES.

SPECIFICATION forming part of Letters Patent No. 545,238, dated August 27, 1895.

Application filed November 5, 1894. Serial No. 527,868. (No model.)

*To all whom it may concern:*

Be it known that I, ERNEST ARTHUR LE SUEUR, a subject of the Queen of Great Britain, residing at Ottawa, in the county of Carleton and Province of Ontario, Canada, have invented certain new and useful Improvements in Means of Counterbalancing End-Pressure in Steam-Turbines, of which the following is a specification, reference being had therein to the accompanying drawings.

In any form of steam-turbine the steam acts with greater pressure upon one face of the turbine disk or plate than upon the other, and it is necessary to take up or counterbalance this excess of pressure in some way or other. One well-known method of securing the foregoing result is by arranging twin turbines on the same shaft, with the steam-pressure on each pulling or pushing in a direction which is opposite to that on the other. In other words, the arrangement is such as to cause the steam-pressure to be in opposite directions on the different turbines, so as to balance.

My invention consists in an improved construction and combination of parts in which is utilized the pressure of cold water or other liquid on a balancing-plate that is fast on the shaft, such pressure acting in a direction which is opposite to that of the steam-pressure, and the action being such as to secure exact equipoise between the two pressures.

The invention first will be described with reference to the accompanying drawings, after which the distinguishing characteristics thereof will be particularly pointed out, and distinctly defined in the claims at the close of this specification.

Figure 1 of the drawings shows in vertical cross-section sufficient of a steam-turbine having the preferred embodiment of my invention applied thereto to disclose the relations and nature of the invention. Fig. 2 shows separately in elevation the balance plate or disk which is described hereinafter.

1 is the shaft of the turbine. Only the lower end of the said shaft is shown, this being enough for the purposes of the present case. The said lower end is bored axially, as shown, to receive and fit around the projecting cylindrical portion 2 of the step-piece 3. The said step-piece is made preferably of hardened steel, and is formed with a hole extending longitudinally of the cylindrical portion just referred to to receive a charge of, preferably, semi-solid graphite lubricant 4 and the end of the force-screw 5, by means of which the said lubricant may be fed toward the lower end of shaft 1, as required.

6 is the stationary exhaust end plate, through which the screw 5 passes.

7 is the balance-plate, which is referred to hereinbefore. It is circular in plan (see Fig. 2) and formed with a sleeve to fit upon the reduced lower end of the shaft 1, and is secured in place by a screw or screws 8, or the said plate may be applied to the shaft and secured thereon in other desired and known manner.

9 is a depression that is made in the end plate 6 for the reception of the balance-plate 7. The lower or inner portion of this depression corresponds in diameter with the balance-plate, so that the latter just fits and turns therein. The upper or outer portion of the depression is somewhat enlarged or flaring. A narrow space is left between the bottom of the depression and the proximate face of the balance-plate.

10 is a supply-pipe for water or other liquid. The said supply-pipe is shown screwed into a hole in the end plate 6 and registering with a hole 11 in the disk or flange of the step-piece 3. The balance-plate 7 receives the hydraulic pressure which offsets or counterbalances the end pressure of the shaft resulting from the action of the steam on the turbine.

The supply-pipe 10 supplies liquid near the center of the balance-plate. Liquid pressure may be produced on the said plate by reason of the pressure under which the liquid is admitted through the supply-pipe. Preferably, however, the liquid is admitted under little or no pressure, and then is caused to exert pressure against the balance-plate in consequence of the centrifugal force that is generated in it by the revolution of the balance-plate. The said plate, as shown in Fig. 2, may be furnished with projecting ribs 12, which act to stir the liquid and cause it to revolve with the plate. The amount of end pressure which in this way is exerted against the balance-plate is, at the high speed of steam-turbines, quite sufficient to balance several tons of total steam-pressure.

The automatic action of the device is as follows: Allowing a constant inward flow of a moderate amount of cold water through the supply-pipe, the revolution of the balance-plate with its ribs causes the water to revolve and exert centrifugal force, thereby crowding the water toward the outer portions of the depression or chamber in which the balance-plate revolves. This results in transmitting pressure to the balance-plate in the direction of the length of the shaft 1, and also oppositely to the direction of the steam-pressure on the said shaft. The balance-plate is of such proportions that when the space between itself and the bottom of the chamber or depression is full of water the pressure upon the balance-plate due to the centrifugal force of this amount of water is considerably greater than the steam end thrust. Therefore, when water is admitted it flows in until the space aforesaid contains a sufficient amount of water to balance the steam-pressure with its centrifugal pressure on the balance-plate, and after this point is passed the centrifugal force will overbalance the steam-pressure and force the balance-plate and shaft back. This will cause a leakage of water all around the edge of the balance-plate just as soon as the latter passes into the enlarged portion of the depression or chamber, and the leakage will occur just as fast as water is supplied to the space. Thereby the balance-plate and shaft will be held in equilibruim between the two pressures.

A great advantage of the invention is the cooling effect of the water on the shaft-step.

As will be obvious, my invention is fitted for use elsewhere than in steam-turbines.

I claim as my invention—

1. The combination with the shaft 1, and a balance plate mounted thereon, of a plate formed with a depression or chamber in which said balance plate works, the said depression or chamber having its outer portion enlarged to permit escape of liquid around the edge of the balance plate, and means for delivering liquid into the space between the face of the balance plate and the bottom of the depression or chamber, substantially as described.

2. The combination with the shaft 1, and a balance plate mounted thereon and provided with means for causing the liquid to revolve therewith, of a chamber in which said plate revolves, and means for delivering liquid into the space between the face of the balance plate and the proximate wall of the chamber, substantially as described.

3. The combination with the shaft 1, and a balance plate mounted thereon and provided with means for causing the liquid to revolve therewith, of a chamber in which said plate revolves, means for delivering liquid into the space between the face of the balance plate and the proximate wall of the chamber, and means providing for the escape of the liquid from the chamber when the liquid end pressure overbalances the steam end pressure, substantially as described.

4. The combination with the shaft 1, and a balance plate mounted thereon and provided with means for causing the liquid to revolve therewith, of a plate formed with a depression or chamber in which said balance plate works, the said depression or chamber having its outer portion enlarged to permit escape of liquid around the edge of the balance plate, and means for delivering liquid near the axis of rotation into the space between the face of the balance plate and the bottom of the depression or chamber, substantially as described.

In testimony whereof I affix my signature in presence of two witnesses.

ERNEST ARTHUR LE SUEUR.

Witnesses:
L. A. SMITH,
J. BISHOP.